US007089384B2

(12) United States Patent
Tross et al.

(10) Patent No.: US 7,089,384 B2
(45) Date of Patent: *Aug. 8, 2006

(54) APPLIANCE FOR ASYNCHRONOUS DATA STORAGE MIRRORING

(75) Inventors: Martin Tross, Haifa (IL); Aviad Zlotnick, Galil Takhton (IL)

(73) Assignee: International Business Machines Corporation, Armonk, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 10/747,732

(22) Filed: Dec. 29, 2003

(65) Prior Publication Data
US 2005/0071589 A1    Mar. 31, 2005

Related U.S. Application Data

(63) Continuation-in-part of application No. 10/673,733, filed on Sep. 29, 2003, and a continuation-in-part of application No. 10/673,745, filed on Sep. 29, 2003, and a continuation-in-part of application No. 10/673,529, filed on Sep. 29, 2003.

(51) Int. Cl.
  *G06F 12/16*    (2006.01)
(52) U.S. Cl. ............... 711/162; 711/161; 711/159; 707/204; 714/6
(58) Field of Classification Search ............... None
  See application file for complete search history.

(56) References Cited

U.S. PATENT DOCUMENTS

| | | | |
|---|---|---|---|
| 6,732,124 B1* | 5/2004 | Koseki et al. | 707/202 |
| 6,772,303 B1* | 8/2004 | Crockett et al. | 711/162 |
| 2003/0061240 A1* | 3/2003 | McCann et al. | 707/200 |
| 2003/0154305 A1* | 8/2003 | Bethmangalkar et al. | 709/245 |
| 2004/0236984 A1* | 11/2004 | Yamasaki | 714/6 |

* cited by examiner

Primary Examiner—Reginald G. Bragdon
Assistant Examiner—Daniel Ko
(74) Attorney, Agent, or Firm—Stephen C Kaufman

(57) ABSTRACT

A method for managing a data storage system includes maintaining a record predictive of locations to which data are to be written on a first storage medium by a host computer. Upon receiving a write command from the host computer directed to storing specified data at a specified location on the first storage medium, if the specified location is not included in the record, the record is updated responsively to the specified location. A signal is sent to the host computer that the specified data have been stored in the data storage system responsively to storing the specified data and, if the specified location was not included in the record, responsively to updating the record. The specified data are copied to the second storage medium responsively to the record, and are stored in the specified location on both the first and second storage media.

91 Claims, 8 Drawing Sheets

APPLIANCE FOR ASYNCHRONOUS DATA STORAGE MIRRORING

CROSS-REFERENCE TO RELATED APPLICATIONS

This application is a continuation-in-part of the following U.S. patent applications: U.S. Ser. No. 10/673,733; U.S. Ser. No. 10/673,529; and U.S. Ser. No. 10/673,745, all filed Sep. 29, 2003. The disclosures of these related applications are incorporated herein by reference.

FIELD OF THE INVENTION

The present invention relates generally to data storage systems, and specifically to data mirroring for failure protection and improving performance of storage systems.

BACKGROUND OF THE INVENTION

Data backup is a standard part of all large-scale computer data storage systems (and most small systems, as well). Data written to a primary storage medium, such as a volume on a local storage subsystem, are copied, or "mirrored," to a backup medium, typically another volume on a remote storage subsystem. The backup volume can then be used for recovery in case a disaster causes the data on the primary medium to be lost. Methods of remote data mirroring are surveyed by Ji et al., in an article entitled "Seneca: Remote Mirroring Done Write," Proceedings of USENIX Technical Conference (San Antonio, Tex., June, 2003), pages 253–268, which is incorporated herein by reference. The authors note that design choices for remote mirroring must attempt to satisfy the competing goals of keeping copies as closely synchronized as possible, while delaying foreground writes by host processors to the local storage subsystem as little as possible.

Large-scale storage systems, such as the IBM Enterprise Storage Server (ESS) (IBM Corporation, Armonk, N.Y.), typically offer a number of different copy service functions that can be used for remote mirroring. Among these functions is peer-to-peer remote copy (PPRC), in which a mirror copy of a source volume on a primary storage subsystem is created on a secondary storage subsystem. When an application on a host processor writes to a PPRC volume on the primary subsystem, the corresponding data updates are entered into cache memory and non-volatile storage at the primary subsystem. The control unit (CU) of the primary subsystem then sends the updates over a communication link to the secondary subsystem. When the CU of the secondary subsystem has placed the data in its own cache and non-volatile storage, it acknowledges receipt of the data. The primary subsystem then signals the application that the write operation is complete.

PPRC provides host applications with essentially complete security against single-point failures, since all data are written synchronously to non-volatile media in both the primary and secondary storage subsystems. On the other hand, the need to save all data in non-volatile storage on both subsystems before the host write operation is considered complete can introduce substantial latency into host write operations. In some large-scale storage systems, such as the above-mentioned IBM ESS, this latency is reduced by initially writing data both to cache and to high-speed, non-volatile media, such as non-volatile random access memory (RAM), in both the primary and secondary subsystems. The data are subsequently copied to disk asynchronously (an operation that is also referred to as "hardening" the data) and removed from the non-volatile memory. The large amount of non-volatile memory that must be used for this purpose is very costly.

Data mirroring functions are commonly classified as either "synchronous" or "asynchronous." In synchronous mirroring, all updates (data write operations) are propagated immediately to the secondary subsystem. This is generally the safest mode of operation, but also the slowest, since host writes are not acknowledged until the data have been stored in non-volatile media on both the primary and secondary subsystems. When asynchronous mirroring is used, on the other hand, hosts receive notification from the primary subsystem that a write is complete as soon as the data have been placed in the cache on the primary subsystem (or possibly after the data have been secured in non-volatile storage on the primary subsystem). The updates of the data are read out from the cache and sent to the secondary subsystem in a separate, background operation. The asynchronous approach gives better performance, in terms of response time to host writes, but is vulnerable to partial data loss in the case of failure.

SUMMARY OF THE INVENTION

The parent applications cited above disclose methods for data mirroring that can be used to create storage systems that are immune to single-point failures, have low-latency write response, and permit rapid recovery after failure, without requiring special non-volatile memory or other costly components. The storage systems described in the parent applications comprise primary and secondary storage subsystems, which are configured to back up data from the primary to the secondary subsystem over a communication link in an asynchronous mirroring process. The mirroring process is carried out by the control units of the storage subsystems using novel predictive metadata records to identify storage locations that may be "out of sync" (i.e., may contain different data) on the primary and secondary subsystems.

The present patent application describes the use of an asynchronous replication appliance (ARA) in carrying out data backup, using predictive metadata records similar to those disclosed in the parent applications. The ARA intercepts write commands on their way from a host computer to a local storage medium, such as commands sent by the host over a storage area network (SAN) to a disk controller. The ARA accumulates the data written by the host and asynchronously transfers the data to a remote site, for storage on a backup storage medium. The ARA uses the predictive records to keep track of storage locations to which new data may have been written by the host, but not yet transferred to the backup medium, i.e., locations at which the backup medium may be out of sync with the local medium. The predictive records can be used to facilitate rapid recovery from failure of the ARA.

The ARA can be used in this manner in conjunction with a wide range of different storage subsystems and devices, such as SAN disks, network-attached storage (NAS) devices, and even Small Computer System Interface (SCSI)-based disks that are accessed locally by host computers. The ARA thus provides enhanced data storage security, without requiring storage system operators to use high-cost storage subsystems with built-in data backup facilities.

In some embodiments of the present invention, ARAs are configured to control access by hosts to local storage media, using predictive metadata records in performing storage management functions (such as block allocation and locking). The predictive records are useful in reducing the overhead associated with these functions. The ARAs may also be configured to carry out data backup using the predictive records, in conjunction with their storage management functions. Alternatively, data backup may be handled by a separate and independent element of the storage system.

There is therefore provided, in accordance with an embodiment of the present invention, a method for managing a data storage system that includes first and second storage media, the method including:

maintaining a record predictive of locations to which data are to be written on the first storage medium by a host computer;

receiving a write command from the host computer directed to storing specified data at a specified location on the first storage medium;

if the specified location is not included in the record, updating the record responsively to the specified location;

signaling the host computer that the specified data have been stored in the data storage system responsively to storing the specified data and, if the specified location was not included in the record, responsively to updating the record;

copying the specified data to the second storage medium responsively to the record; and storing the specified data in the specified location on both the first and second storage media.

Typically, copying the specified data includes transmitting the specified data between mutually-remote sites over a communication link between the sites. Additionally or alternatively, copying the specified data includes asynchronously mirroring on the second storage medium the data that are stored on the first storage medium. Further additionally or alternatively, maintaining and updating the record include marking respective bits in a bitmap corresponding to the locations to which the data are to be written on the first and second non-volatile storage media.

In disclosed embodiments, updating the record includes predicting one or more further locations to which the host computer is expected to write the data in a subsequent write operation, and adding the one or more further locations to the record. Additionally or alternatively, updating the record includes removing one or more locations, other than the specified location, from the record, so as to limit a size of the record.

In some embodiments, maintaining the record includes storing the record in a non-volatile memory, and updating the record includes modifying the record that is stored in the non-volatile memory. Typically, modifying the record includes comparing the specified location to a copy of the record held in a volatile memory, modifying the copy of the record so that at least the specified location is included in the copy of the record, and destaging the modified copy of the record to the non-volatile memory. The record is not modified in the non-volatile memory responsively to receiving the write command as long as the specified location to which the specified data are to be written is included in the record. Typically, modifying the record includes adding a plurality of locations, including the specified location, to the record.

In a disclosed embodiment, receiving the write command includes intercepting the write command using a data storage appliance, which includes the non-volatile memory, wherein the data storage appliance copies the specified data to the second storage medium, and maintains and updates the record in the non-volatile memory. Typically, copying the specified data includes, upon recovery from a failure of the data storage appliance, reading the record from the non-volatile memory, and copying the data to the second storage medium from the locations on the first storage medium that are indicated in the record.

In further embodiments, receiving the write command includes intercepting the write command using a data storage appliance, which maintains and updates the record, and which copies the specified data to the second storage medium. Typically, copying the specified data includes copying the data, using the data storage appliance, from the specified location on the first storage medium to the second storage medium, wherein copying the data includes selecting the locations on the first storage medium, including the specified location, from which to copy the data responsively to the record.

In a disclosed embodiment, intercepting the write command includes receiving the write command at a first data storage appliance, and maintaining the record includes holding the record on a second data storage appliance, wherein updating the record includes sending a message from the first data storage appliance to the second data storage appliance so as to cause the second data storage appliance to update the record. Typically, updating the record further includes receiving an acknowledgment of the message at the first data storage appliance from the second data storage appliance, and signaling the host computer includes notifying the host computer that the specified data have been stored responsively to receiving the acknowledgment.

Additionally or alternatively, the method includes, upon occurrence of a failure in the first data storage appliance, copying the data to the second storage medium using the second data storage appliance from the locations on the first storage medium that are indicated in the record.

In a disclosed embodiment, maintaining the record includes maintaining on the first data storage appliance a copy of the record held on the second data storage appliance, and sending the message includes deciding at the first data storage appliance to send the message responsively to the copy of the record. Typically, sending the message includes modifying both the record and the copy of the record responsively to the specified location. Modifying both the record and the copy of the record may include adding a plurality of locations, including the specified location, to both the record and the copy of the record. Additionally or alternatively, maintaining the copy of the record includes selecting one or more locations, other than the specified location, to be removed from the record, and instructing the second data storage appliance to remove the one or more locations from the record, so as to limit a size of the record.

There is also provided, in accordance with an embodiment of the present invention, a method for managing a data storage system that includes a local storage medium, the method including:

coupling first and second data storage appliances to provide one or more host computers with access to the local storage medium via the data storage appliances;

maintaining on the second data storage appliance a record indicative of first locations on the local storage medium to which a host computer has directed a write command via the first data storage appliance;

adding to the record one or more entries that are predictive of second locations on the local storage medium to which data are expected to be written via the first data storage appliance;

receiving at the second data storage appliance, from one of the host computers, a request to access the data stored at a specified location on the local storage medium; and if the specified location is included in the record, sending a message from the second data storage appliance to the first data storage appliance so as to ascertain a status of the data at the specified location before permitting the one of the host computers to access the data stored at the specified location.

In a disclosed embodiment, coupling the first and second data storage appliances includes configuring the data storage appliances to virtualize the access by the host computers to the local storage medium. Additionally or alternatively, the method may include copying the data stored on the local storage medium to a remote storage medium, using at least the first data storage appliance, in a data mirroring process.

Typically, the method includes permitting the one of the host computers to access the data stored at the specified location via the second data storage appliance in response to the request without sending the message if the specified location is not included in the record.

In disclosed embodiments, adding the one or more entries includes, upon receiving the write command at the first data storage appliance to write the data to a given location, sending an instruction from the first data storage appliance to the second data storage appliance, which causes the second data storage appliance to include the given location and one or more of the second locations in the record. Typically, maintaining the record includes maintaining a copy of the record on the first data storage appliance, and sending the instruction includes determining whether to send the instruction responsively to the copy of the record, wherein determining whether to send the instruction includes deciding to send the instruction only if the given location is not included in the record.

In a further embodiment, receiving the request from the one of the host computers includes receiving a further write command from the one of the host computers at the second data storage appliance, and updating the data stored at the specified location, using the second data storage appliance, responsively to the further write command. Typically, the method includes maintaining a further record on the first data storage appliance, indicative of third locations at the which the data have been updated by the second data storage appliance and including further entries that are predictive of fourth locations on the local storage medium to which data are expected to be written via the second data storage appliance. Upon receiving at the first data storage appliance, from a further one of the host computers, a further request to access the data stored at a further location on the local storage medium, if the further location is included in the record, a further message is sent from the first data storage appliance to the second data storage appliance so as to ascertain the status of the data at the further location before permitting the further one of the host computers to access the data stored at the further location.

There is additionally provided, in accordance with an embodiment of the present invention, apparatus for data storage, including:

first and second storage media; and at least one data storage appliance, including a memory and a control unit, which is coupled to intercept write commands issued by a host computer for writing data to the first storage medium, and to copy the data to the second storage medium in a mirroring process so that the data are stored on both the first and second storage media, and wherein the control unit is arranged to maintain in the memory a record predictive of locations to which the data are to be written on the first storage medium by a host computer, and to copy the data to the second storage medium responsively to the record.

There is further provided, in accordance with an embodiment of the present invention, data storage apparatus, including:

a local storage medium; and first and second data storage appliances, which are coupled to provide one or more host computers with access to the local storage medium via the data storage appliances, wherein the second data storage appliance is arranged to maintain a record indicative of first locations on the local storage medium to which a host computer has directed a write command via the first data storage appliance, and to add to the record one or more entries that are predictive of second locations on the local storage medium to which data are expected to be written via the first data storage appliance, and wherein the second data storage appliance is arranged, upon receiving a request from one of the host computers to access the data stored at a specified location on the local storage medium, if the specified location is included in the record, to send a message to the first data storage appliance so as to ascertain a status of the data at the specified location before permitting the one of the host computers to access the data stored at the specified location.

There is moreover provided, in accordance with an embodiment of the present invention, a computer software product for use in a data storage system that includes first and second storage media and at least one data storage appliance having a control unit, the product including a computer-readable medium in which program instructions are stored, which instructions, when read by the control unit, cause the data storage appliance to intercept write commands issued by a host computer for writing data to the first storage medium, and to copy the data to the second storage medium in a mirroring process so that the data are stored on both the first and second storage media, wherein the instructions cause the control unit to maintain a record predictive of locations to which the data are to be written on the first storage medium by a host computer, and to copy the data to the second storage medium responsively to the record.

There is furthermore provided, in accordance with an embodiment of the present invention, a computer software product for use in a data storage system that includes a local storage media and first and second data storage appliances, which include respective first and second control units and are coupled to provide one or more host computers with access to the local storage medium via the data storage appliances, the product including a computer-readable medium in which program instructions are stored, which instructions, when read by the control units, cause the second control unit to maintain a record indicative of first locations on the local storage medium to which a host computer has directed a write command via the first data storage appliance, and to add to the record one or more entries that are predictive of second locations on the local storage medium to which data are expected to be written via the first data storage appliance, and wherein the instructions further cause the second control unit, upon receiving a request from one of the host computers to access the data stored at a specified location on the local storage medium, if the specified location is included in the record, to send a message to the first data storage appliance so as to ascertain a status of the data at the specified location before permitting the one of the host computers to access the data stored at the specified location.

The present invention will be more fully understood from the following detailed description of the embodiments thereof, taken together with the drawings in which:

DETAILED DESCRIPTION OF EMBODIMENTS

Figure 1:
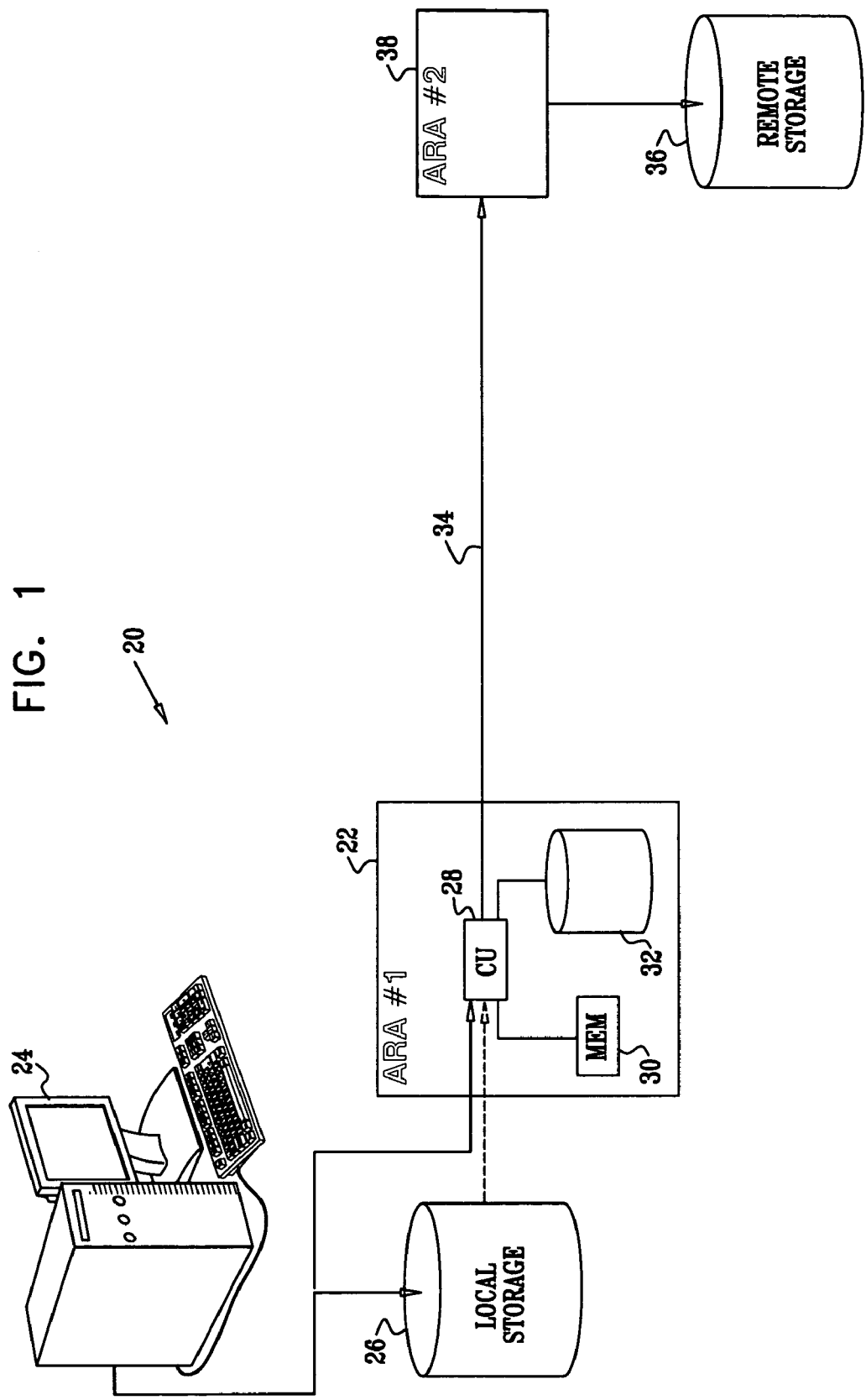
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a data storage appliance, referred to hereinafter as an asynchronous replication appliance (ARA) 22, whose function is to back up data written by a host computer 24 to a local storage medium 26. Although for the sake of simplicity, only a single host and storage medium are shown in FIG. 1, in practice ARA 22 may be configured to serve multiple hosts and/or multiple storage devices, including hosts running different operating systems and heterogeneous types of storage devices. For example, storage medium 26 may comprise a SAN disk (or disk array, such as a redundant array of independent disks—RAID), a NAS device, a storage server or substantially any other sort of network-accessible storage medium that is known in the art. In such cases, host 24, storage medium 26 and ARA 22 typically communicate with one another over a communication network, such as a SAN.

Alternatively, storage medium 26 may comprise a local disk, which is coupled to host 24 by a suitable bus, such as a SCSI bus. In this case, ARA 22 is coupled to host 24 by a suitable communication bus or other link (which may be a network link). The software running on host 24, or possibly the firmware of the disk controller of the storage medium, is modified to enable ARA 22 to interact with the host and storage medium in the manner described below.

ARA 22 comprises a control unit (CU) 28 with a local volatile memory 30 and a non-volatile memory 32. Typically, CU 28 comprises a microprocessor, volatile memory 30 comprises random access memory (RAM), and non-volatile memory 32 comprises a magnetic disk and/or non-volatile RAM. ARA 22 intercepts write commands on their way from host 24 to storage medium 26, and then sends the write data asynchronously over a communication link 34 to a remote site, where the data are written to a remote storage medium 36. CU 28 of ARA 22 performs these functions under the control of software, which may be downloaded to the ARA in electronic form, over a network, for example, or may alternatively be provided on tangible media, such as CD-ROM. The storage appliances shown in other embodiments, described below, typically run under similar software control. Although ARA 22 is shown as being physically distinct and separate from host 24 and storage medium 26, in practice this storage appliance (and likewise the storage appliances shown in other embodiments described below) may be physically integrated with either host 24 or storage medium 26.

Typically, to avoid adding too much latency to host write operations due to data backup operation, ARA 22 is located near host 24 and storage medium 26. The ARA may be held in a secure location, with its own uninterruptible power supply or battery backup, so that it can continue to function even in the event of a disastrous failure at the site of the host or storage medium. Remote storage medium 36 may be located far away from ARA 22, since the asynchronous backup operations carried out by the ARA do not generally add latency to storage access by host 24.

A second ARA 38 may be used to manage storage at the remote site, although the use of such an appliance at the remote site is not essential to the present embodiment. ARA 22 and ARA 38 may also be configured to mirror data symmetrically between their respective sites, as described, for example, in the above-mentioned U.S. patent application Ser. No. 10/673,745. Furthermore, for added data security, system 20, as well as the systems described below in other embodiments, may be configured for redundant backup at two or more remote sites.

In typical operation of system 20, ARA 22 intercepts each data write command by host 24. In the context of the present patent application and in the claims, the term "write command" is meant to include any sort of request, instruction or message sent by a computer for the purpose of modifying data stored on a storage medium. System 20 may alternatively be configured so that ARA 22 intercepts only certain write commands according to predefined criteria. For example, the ARA may intercept only write commands generated by certain application programs running on the host. The ARA maintains a list of data locations (for example, a list of tracks) to which host 24 has written on local storage medium 26, and from which the data have yet to be transferred to backup storage on remote medium 36. This list contains metadata identifying the data to be transferred, and is referred to hereinbelow as the "out-of-sync" (OOS) list or record, or OOS bitmap in some implementations. After updating its metadata records, as described below, ARA 22 sends an acknowledgment to the host. Upon receiving the acknowledgment from ARA 22 and from local storage medium 26, the host software considers the write operation to have been completed successfully.

As noted above, ARA 22 transfers the data from the locations on the OOS list to remote storage medium 36 asynchronously and independently of the completion of write operations between host 24 and local storage medium 26. When the data traffic is not too heavy, ARA 22 may accumulate the write data in its own volatile memory 30 or non-volatile memory 32. When the memory of ARA 22 is insufficient for this purpose, however, the ARA does not immediately copy the data upon host writes. Rather, ARA 22 simply updates its metadata records, as described below, in order to avoid delaying the completion of host write operations. In this case, when the time comes to transfer the data from the locations on the OOS list to the remote storage medium, ARA 22 reads the data from the listed locations on local storage medium 26, and transfers the data to the remote site. This mode of operation permits the ARA to be configured with only limited memory resources, while still providing rapid, reliable recovery from failures of the ARA.

Figure 2:
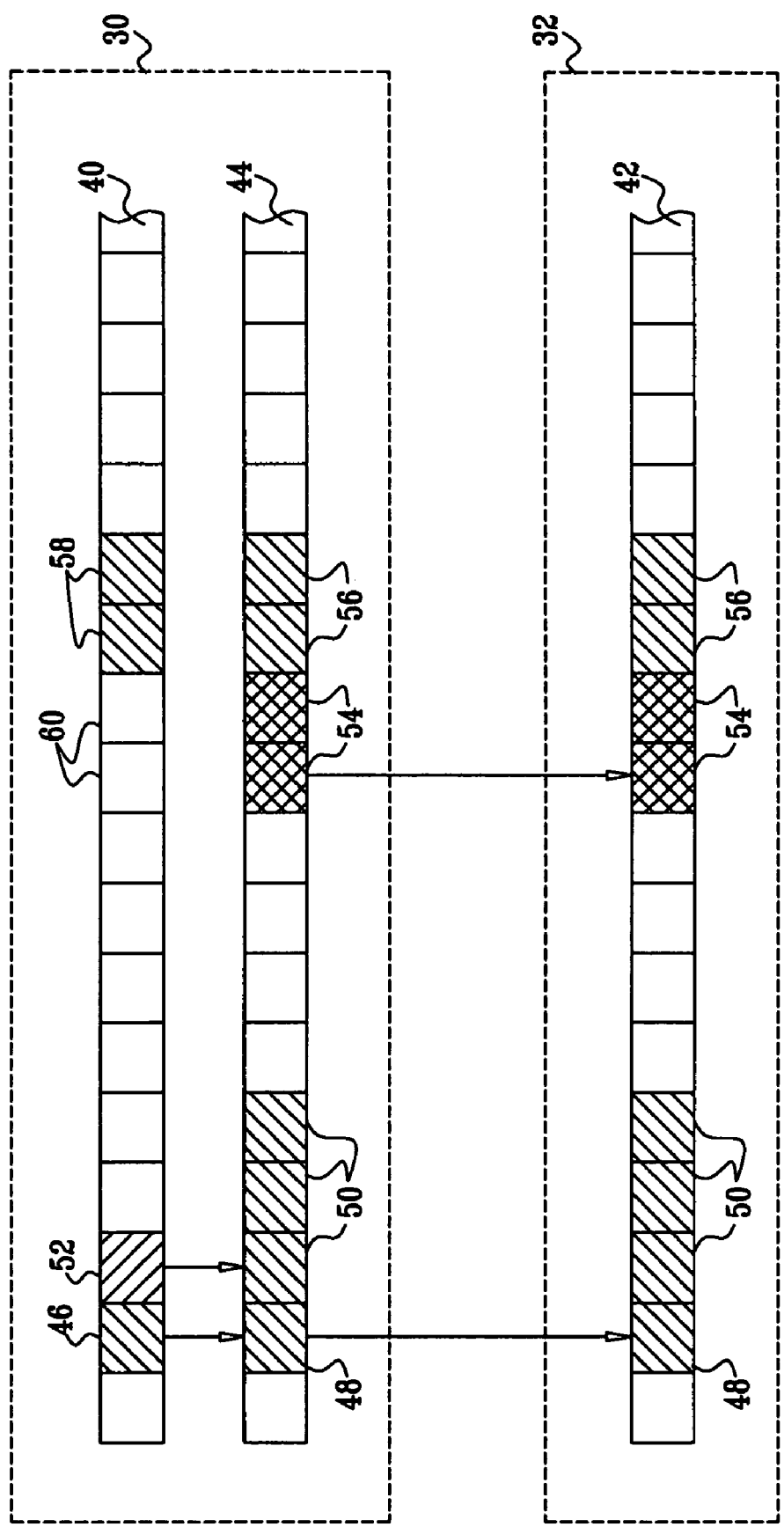
FIG. 2 is a schematic representation of data structures used in tracking data storage, in accordance with an embodiment of the present invention.

FIG. 2 is a schematic representation of bitmaps 40, 42 and 44, which are maintained by ARA 22 for tracking data storage in system 20, in accordance with an embodiment of the present invention. Bitmaps 40, 42 and 44 are metadata records, which are used by ARA 22 in recording the locations at which the data on remote storage medium 36 are or may be out of sync with the data on local storage medium 26. Each bit represents a different location. Typically, when storage media 26 and 36 comprise disks, each bit in the bitmaps corresponds to a disk track, but the bits (and the corresponding locations) may alternatively correspond to different sorts of data elements, of finer or coarser granularity. Furthermore, although the bitmaps described here are a convenient means for maintaining metadata records, other types of data structures may similarly be used for the purposes of the present invention, as will be apparent to those skilled in the art.

Bitmap 40, which is held in volatile memory 30 of ARA 22, is referred to as the "out-of-sync" (OOS) bitmap. This bitmap indicates the locations on remote storage medium 36 that are out of sync with the corresponding locations on local storage medium 26. In other words, when control unit 28 of ARA 22 intercepts a command from host 26 to write data to a specified storage location, the control unit sets the corresponding bit in bitmap 40. Control unit 28 then sends the write data asynchronously over link 34 to remote storage media 36, and clears the bit in bitmap 40 when it receives an acknowledgment from the remote site that the data have been stored at the specified location.

Clearly, if ARA 22 fails and then subsequently recovers, any locations marked by bits that were set in bitmap 40 at the time of failure must be copied from local storage medium 26 to remote storage medium 36 in order to synchronize the storage media. Bitmap 40, however, is maintained in volatile memory, and may therefore be lost in the case of a power outage or other disastrous failure of ARA 22. It is possible to maintain bitmap 40 in non-volatile memory 32, but this alternative would require control unit 28 of ARA 22 to access the non-volatile memory every time it transmits data to or receives an acknowledgment from subsystem 24. These frequent accesses to the non-volatile memory would add considerably to the overhead, and hence the latency, of host write operations.

To address this problem, control unit 28 maintains bitmap 42 in non-volatile memory 32. As can be seen in FIG. 2, the bits that are set in bitmap 42 are a superset of the bits set in bitmap 40. Therefore, bitmap 42 is referred to as the "maybe-out-of-sync" (MOOS) bitmap. A copy of the contents of bitmap 42 may also be held in bitmap 44 in volatile memory 30. During normal operation, control unit 28 selects the bits to be set in bitmap 42 in such as way as to limit the frequency with which the control unit must access non-volatile memory 32 in order to update bitmap 42, while still ensuring that all bits set in bitmap 40 are also set in bitmap 42. To achieve this objective, control unit 28 chooses the bits to set in bitmap 42 using a predictive method, as described hereinbelow.

Upon recovery of ARA 22 from a failure, control unit 28 reads bitmap 42 from non-volatile memory 32, in order to determine the tracks that are to be copied from local storage medium 26 to remote storage medium 36. The control unit then copies the contents of these tracks from the local storage medium to the remote storage medium. While ARA 22 is out of service, host writes to local storage media 26 are not backed up, and therefore host writes may have to be suspended until failure recovery is completed. To address this problem, ARA 38 may be configured to operate in a failover mode, or a second ARA may be used alongside ARA 22, as described below with reference to FIG. 4.

Figure 3:
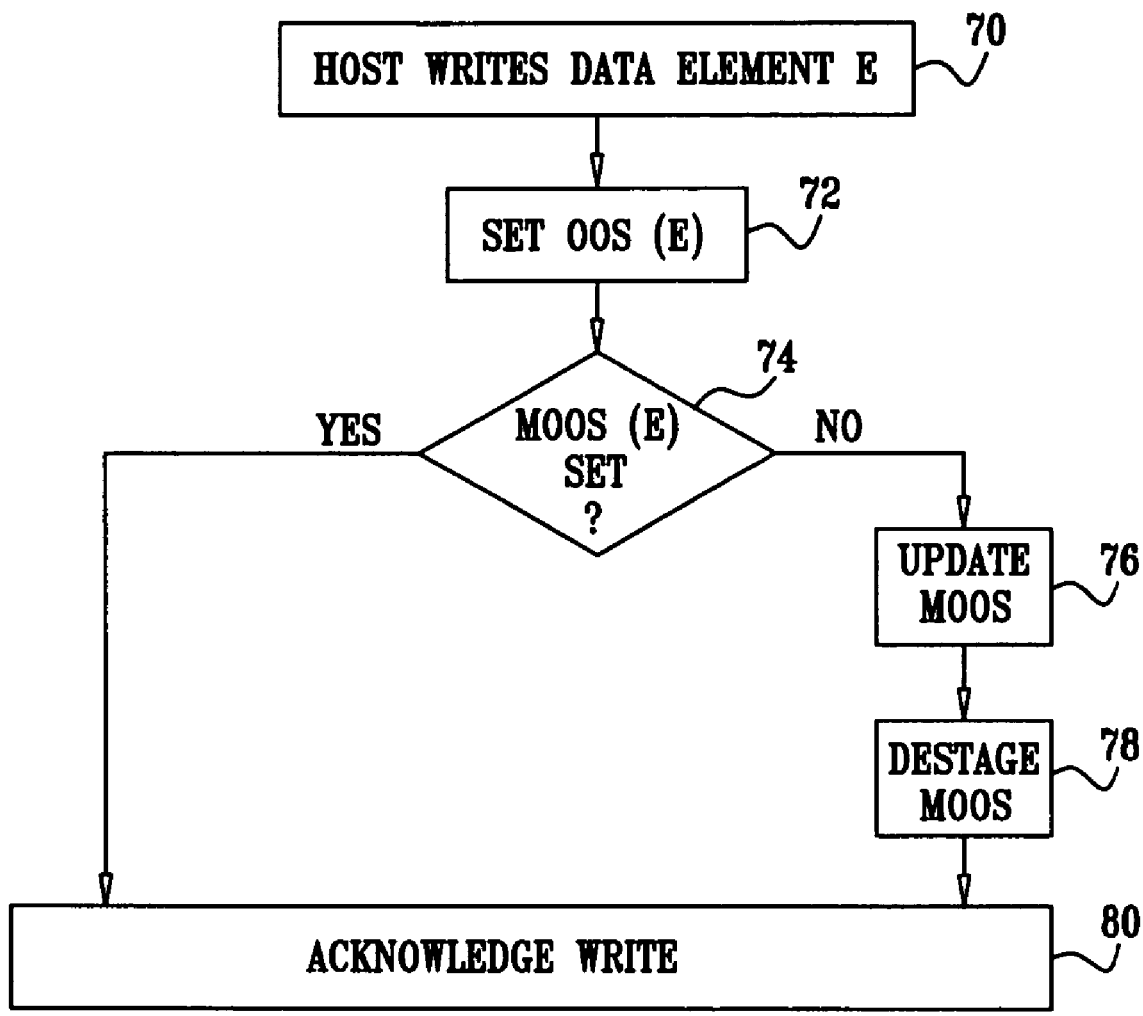
FIG. 3 is a flow chart that schematically illustrates a method for tracking data storage, in accordance with an embodiment of the present invention.

FIG. 3 is a flow chart that schematically illustrates a method for tracking data storage on system 20, in accordance with an embodiment of the present invention. The method uses bitmaps 40, 42 and 44, as shown in FIG. 2, and is described with reference to these bitmaps. Control unit 28 of ARA 22 initiates the method whenever host 24 writes data to a specified location on local storage media 26, at a host writing step 70. The location is denoted here as "track E." Upon receiving the write command from host 24, control unit 28 sets a bit 46 in bitmap 40, referred to as OOS (E), to indicate that track E on local media 26 is out of sync with the corresponding track on remote media 36, at an OOS setting step 72. As noted above, the control unit transmits the data from track E to remote media 36 for storage there in a process-that take place in background, asynchronously with the host write operation and metadata manipulations that are described here. When an acknowledgment is returned from remote storage media 36 to ARA 22, indicating that data have been stored in a certain track or tracks of the remote media, control unit 28 of ARA 22 clears the corresponding bit or bits in bitmap 40.

After setting OOS(E) (bit 46) in bitmap 40, control unit 28 checks bitmap 44 to determine whether the corresponding bit, referred to as MOOS(E), is set in bitmap 44 (and thus in bitmap 42, as well), at a MOOS checking step 74. If MOOS(E), represented in FIG. 2 by a bit 48, is not set in bitmap 44, control unit 28 updates bitmap 44, at a MOOS update step 76. Typically, when the control unit updates the bitmap, it sets not only MOOS(E) (bit 48), but also a group of bits 50, corresponding to tracks to which host 24 is predicted to direct its subsequent write operations. Any suitable prediction algorithm may be used to select bits 50. For example, bits 50 may comprise the next N bits (in the present example, N=3) in bitmap 42 following MOOS(E), as shown in FIG. 2. Other methods for selecting the bits to be set in bitmaps 42 and 44 are described in the above-mentioned parent application, U.S. Ser. No. 10/673,529.

Control unit 28 may also decide at step 76 to clear some of the bits in bitmap 44 (for which the corresponding bits in bitmap 40 are not set), in order to avoid having too many bits set in bitmap 42 corresponding to tracks that are not actually out of sync. For example, referring to FIG. 2, bits 54 and 56 are set in bitmaps 42 and 44, and bits 58 are also set in bitmap 40. Bits 60, however, are clear in bitmap 40, possibly because the data have already been stored in the corresponding tracks on remote storage media 36, and ARA 22 has received a corresponding acknowledgment, causing control unit 28 to clear these bits. Bits 54 therefore need not remain set in bitmaps 42 and 44, and may be cleared. Methods for selecting the bits to be cleared are also described in U.S. Ser. No. 10/673,529. Clearing bits that are unnecessarily set in bitmap 42 will reduce the time required for recovery after a failure of ARA 22.

The updated bitmap 44 created at step 76 is then destaged, i.e., copied to bitmap 42 on media 34, at a MOOS destaging step 78. Typically, bitmaps 40, 42 and 44 are divided up into several segments (not shown in the figures), each corresponding to a different set of tracks or other storage locations. In this case, only the specific segment (or segments) of bitmap 44 in which bits have been updated at step 76 is destaged at step 78. Alternatively, the entire bitmap may be destaged at this step if appropriate. In either case, only after destaging is complete does control unit 28 signal host 24 to acknowledge that the write operation is complete, at a write acknowledgment step 80.

On the other hand, if control unit 28 finds at step 74 that MOOS(E) is set, there is no need to update and destage bitmaps 42 and 44, and the process therefore continues directly to step 80. For example, after writing to the track corresponding to bit 46, host 24 may continue writing to the next track, which is represented by a bit 52 in bitmap 40. Upon receiving this next host write at step 70, control unit 28 sets bit 52 in bitmap 40. Because of the prediction carried out at the previous pass through step 76, however, the corresponding bit (one of bits 50) is already set in bitmaps 42 and 44. Thus, no further operations are required on these bitmaps at this stage, and control unit 28 can signal host 24 immediately that this write operation has been completed, without taking the time to modify bitmap 42 in non-volatile memory. The use of the predictive MOOS record thus minimized the latency added to host write operations due to data backup, while still ensuring that all data will be properly synchronized within a relatively short time (dependent on the number of tracks marked in bitmap 42) upon recovery from a failure of ARA 22.

Figure 4:
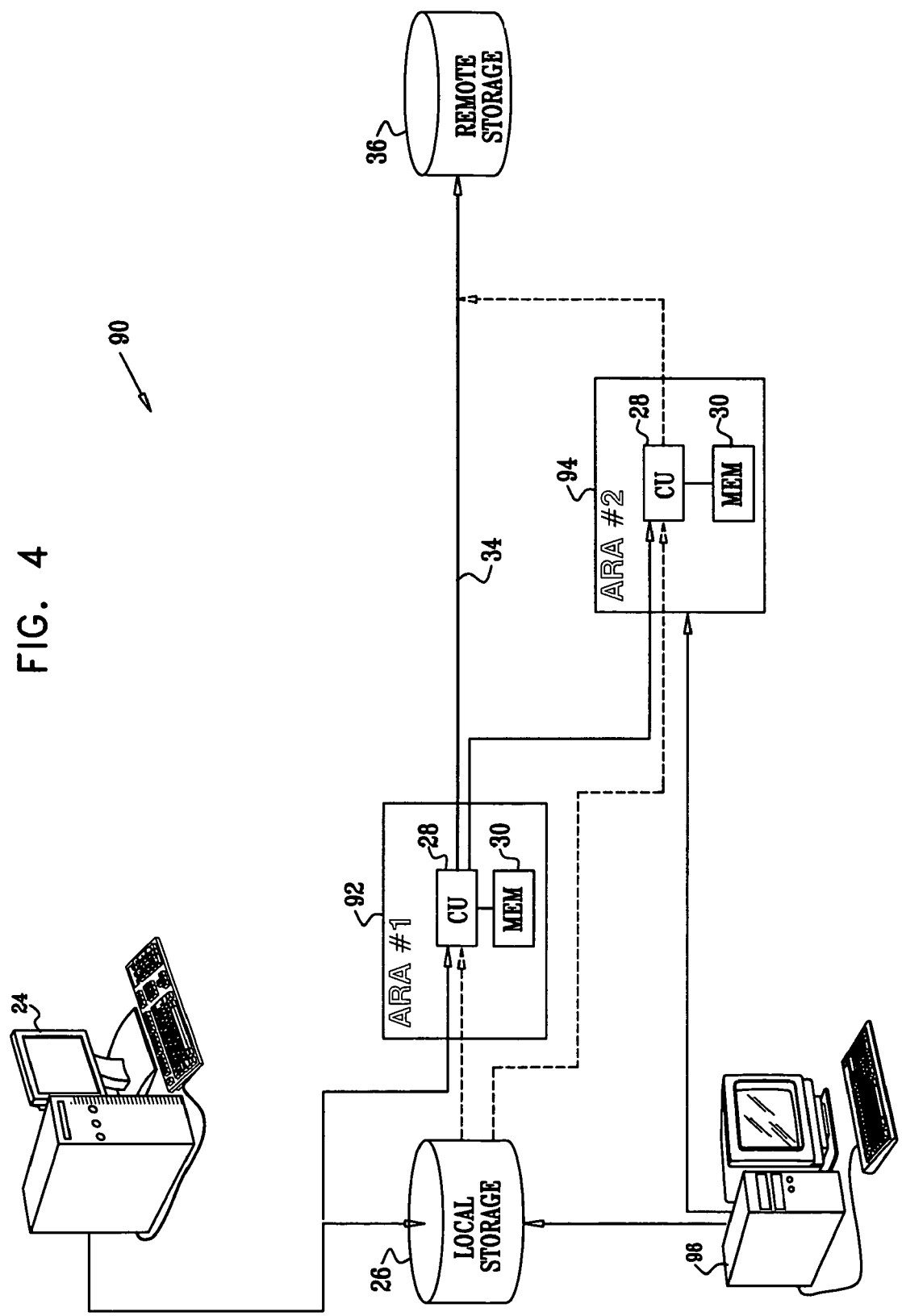
FIG. 4 is a block diagram that schematically illustrates a data storage system, in accordance with an alternative embodiment of the present invention.

FIG. 4 is a block diagram that schematically illustrates a data storage system 90, in accordance with another embodiment of the present invention. In this embodiment, two data storage appliances, ARA 92 and ARA 94, are provided in proximity to host 24 and local storage medium 26. This configuration may provide host 24 with higher availability of storage media, since ARA 94 can immediately take over data backup functions in the event of a failure of ARA 92. For higher efficiency and speed, the load of data backup operations may be divided between ARA 92 and ARA 94, with each ARA configured to take over the functions of the other in case of a failure. Thus, in the example shown in FIG. 4, ARA 92 serves as the primary replication appliance for host 24, while ARA 94 is the primary replication appliance for another host 96. The use of dual replication appliances in a symmetrical configuration is described further hereinbelow with reference to FIG. 6. Alternatively, ARA 92 may serve as the primary replication appliance for all hosts accessing certain local storage media.

Each of ARA 92 and ARA 94 comprises its own control unit 28 and volatile memory 30, as described above. ARA 92 and 94 may also comprise non-volatile memory, but (in contrast to the preceding embodiment) such non-volatile memory is not required for storing the MOOS bitmaps in the present embodiment. Instead, MOOS bitmap 42 (FIG. 2) is held by ARA 94 in its volatile memory 30, while ARA 92 holds bitmaps 40 and 44 in its own volatile memory. In case of a failure of ARA 92, ARA 94 copies MOOS bitmap 42 to serve as its initial OOS bitmap, and immediately takes over the functions of ARA 92. In other words, ARA 94 intercepts host write commands to local storage media 26, updates its OOS bitmap accordingly, and asynchronously copies the data in all the tracks that are marked in the OOS bitmap from local media 26 to remote media 36. Since MOOS bitmap 42 contained a superset of the bits-that were marked in OOS bitmap 40 of ARA 92 before ARA 92 failed, it is ensured that all out-of-sync tracks on local media 26 will be backed up to the remote media. (Typically, some tracks that were marked in the MOOS bitmap but were not actually out of sync will be copied, as well, but this superfluous copying will have only a minor effect, at the worst, on the performance of system 90.) When ARA 92 recovers, the OOS bitmap may be copied back from ARA 94 to ARA 92, which then resumes normal operation. Alternatively, ARA 94 may continue to serve as the primary replication appliance, while ARA 92 takes over the secondary function previously served by ARA 94.

Figure 5:
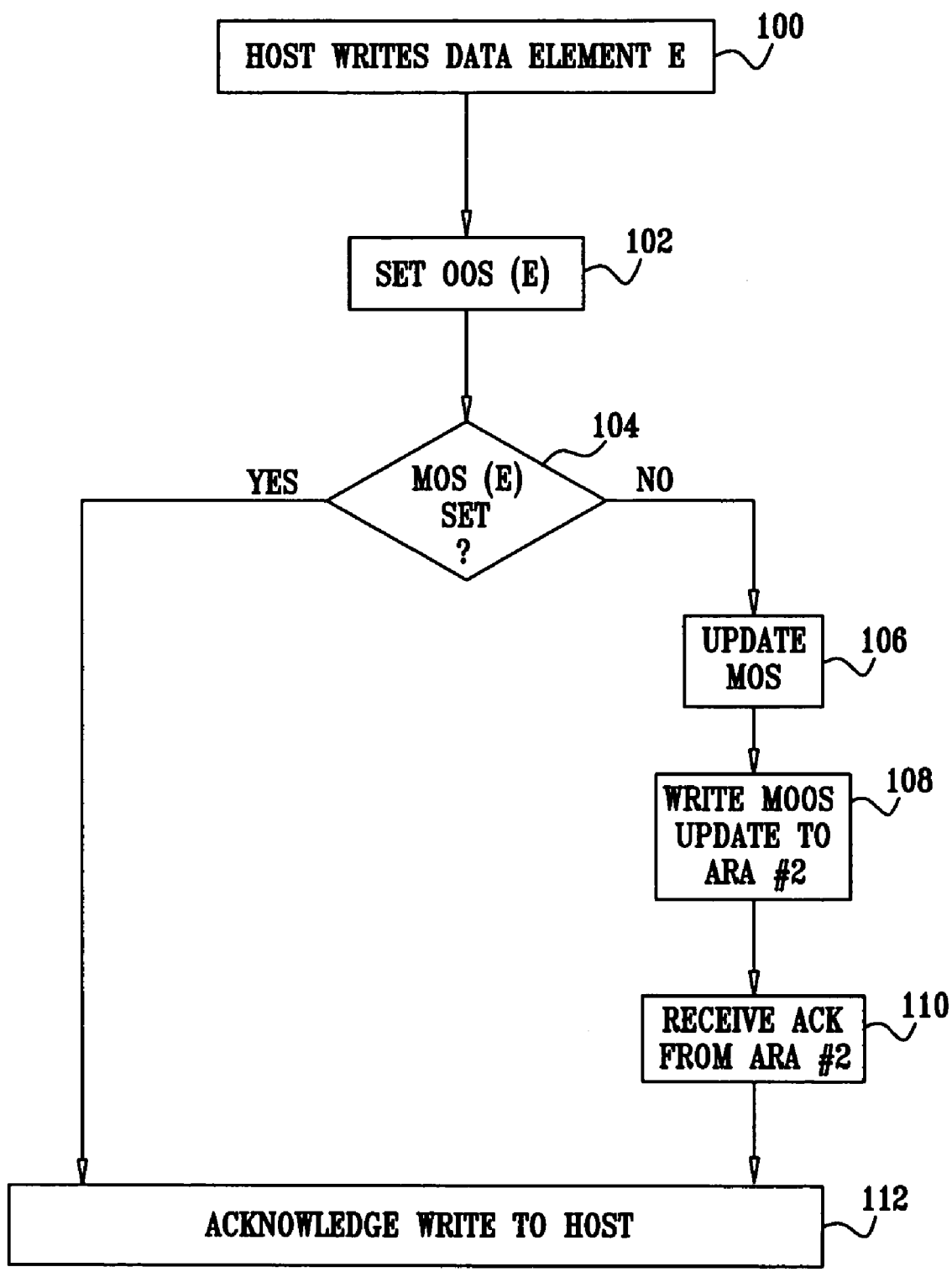
FIG. 5 is a flow chart that schematically illustrates a method for tracking data storage, in accordance with an embodiment of the present invention.

FIG. 5 is a flow chart that schematically illustrates a method for tracking data storage in system 90, in accordance with an embodiment of the present invention. The method uses bitmaps 40, 42 and 44, as shown in FIG. 2, except that as noted above, bitmap 42 is now held in volatile memory 30 of ARA 94, rather than in non-volatile memory. In the description that follows, bitmap 42 is referred to as the MOOS bitmap, while bitmap 40 (in memory 30 of ARA 92) is referred to as the "marked on secondary" (MOS) bitmap, because it indicates to ARA 92 (the primary ARA) which bits have been marked in the MOOS bitmap of ARA 94 (the secondary ARA).

Control unit 28 of ARA 92 initiates the method of FIG. 5 whenever host 24 writes data to a specified location on local storage media 26, at a host writing step 100. The location is again denoted here as "track E." Control unit 28 sets bit 46 in bitmap 40 to indicate that track E on local storage media 26 is out of sync with the corresponding track on remote storage media 36, at an OOS setting step 102. The control unit copies the data from local storage media 26 to remote storage media 36, as noted above, in a background mirroring process that takes place asynchronously with the host write operation and the accompanying metadata manipulations that are described here. Optionally, as part of the mirroring process, control unit 28 of ARA 92 may also copy the data temporarily to memory 30 of ARA 94.

After setting bit 46 in bitmap 40, control unit 28 of ARA 92 checks bitmap 44 to determine whether the corresponding bit, referred to as MOS(E), is set in bitmap 44, at a MOS checking step 104. If MOS (E) is not set in bitmap 44, control unit 28 updates bitmap 44, at a MOS update step 106. Typically, when the control unit updates the bitmap, it sets not only MOS(E) (corresponding to bit 46), but also a group of bits 50, corresponding to tracks to which host 26 is predicted to direct its subsequent write operations, as noted above with reference to FIG. 3. Control unit 28 may also clear certain bits in bitmap 44 at this stage. Methods for selecting the bits to be set and cleared at each pass through step 106 are described in detail in the above-mentioned parent application, U.S. Ser. No. 10/673,733.

Upon updating bitmap 44, control unit 28 of ARA 92 transmits a message to ARA 94, indicating the changes that have been made in bitmap 44, at a MOOS update step 108. When control unit 28 of ARA 94 receives this message, it updates MOOS bitmap 42 accordingly. Control unit 28 of subsystem 94 then returns an acknowledgment (ACK) to ARA 92, at a secondary acknowledgment step 110. Upon receiving this acknowledgment, control unit 28 of ARA 92 signals its own write acknowledgment to host 26, at a host acknowledgment step 112, and the host write operation is done.

On the other hand, if control unit 28 in ARA 92 finds at step 104 that MOS(E) is set, it does not update bitmap 44. For example, after writing to the track corresponding to bit 46, host 26 may continue writing to the next track, which corresponds to bit 52 in bitmap 40. Because of the prediction carried out at the previous pass through step 106, the corresponding bit (one of bits 50) is already set in bitmap 44. Thus, after the control unit of ARA 92 sets OOS(E) at step 102, it can go on immediately to signal acknowledgment to host 26 at step 112. In this case, no further operations are required on the MOS and MOOS bitmaps at this stage, and the host write operation is completed without requiring any synchronous communication between ARA 92 and ARA 94. Synchronous communication is required only when MOS (E) is not set prior to receiving the host write at step 100.

Figure 6:
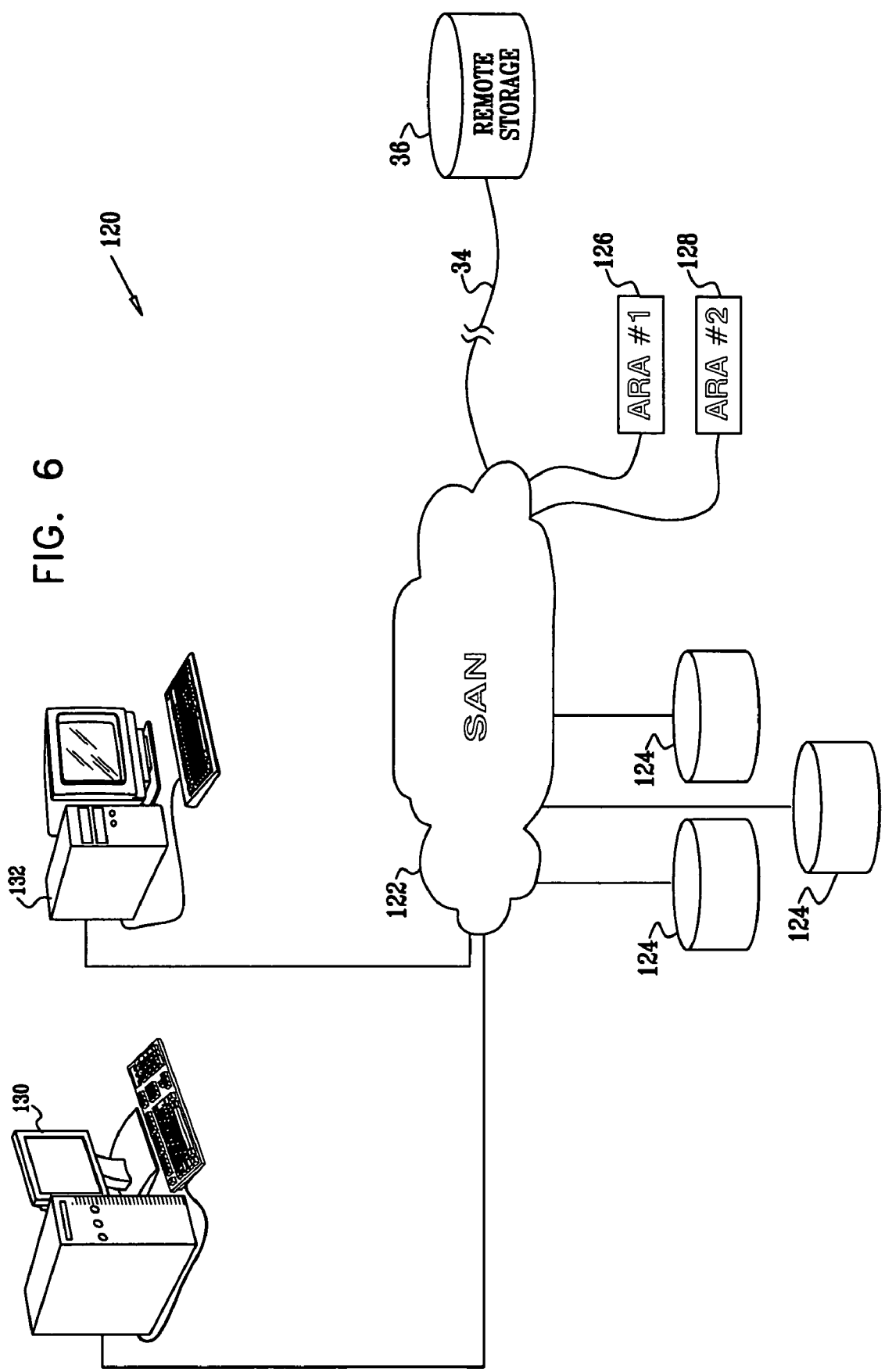
FIG. 6 is a block diagram that schematically illustrates a data storage system, in accordance with yet another embodiment of the present invention.

FIG. 6 is a block diagram that schematically illustrates a data storage system 120, in accordance with yet another embodiment of the present invention. In this embodiment, hosts 130 and 132 access local storage media 124 via a SAN 122. A symmetrical pair of data storage appliances, ARA 126 and ARA 128, control storage access by the hosts to all of the storage media on SAN 122. ARAs 126 and 128 may also handle data mirroring to remote storage media 36. As noted in the preceding embodiments, although ARA 126 and ARA 128 are shown in the figure as physically separate entities from storage media 124, one or both of these data storage appliances may be physically integrated in a storage subsystem together with the storage media. Alternatively, the ARA functions may be integrated in software running on one or more of the hosts.

In the present embodiment, ARA 126 and ARA 128 are configured as storage virtualization engines, as described, for example, by Glider et al., in "The Software Architecture of a SAN Storage Control System," *IBM Systems Journal* 42 (2003), pages 232–249, which is incorporated herein by reference. To summarize briefly, the virtualization function of ARAs 126 and 128 decouples the physical storage provided by storage media 124 from the storage management functions (such as block allocation and locking) that are normally performed by the storage media controllers. Hosts 130 and 132 address media 124 via ARAs 126 and 128 as a single pool of storage resources. The ARAs provide block input/output (I/O) services to the hosts on the basis of logical disks created by the ARAs from this storage pool.

The storage virtualization and control functions of ARAs 126 and 128 may be integrated with the data backup functions performed by the ARAS, as described in detail hereinbelow. Alternatively, the methods described below may be used by the ARAs to control access to local storage media 124, independently of whatever data backup functions—whether asynchronous or synchronous—that are performed in system 120. Furthermore, although storage virtualization is an efficient and useful way to control access by hosts to the storage media in system 120, the functions of ARAs 126 and 128 that are described below may likewise be performed, mutatis mutandis, in systems that do not use storage virtualization.

Figure 7:
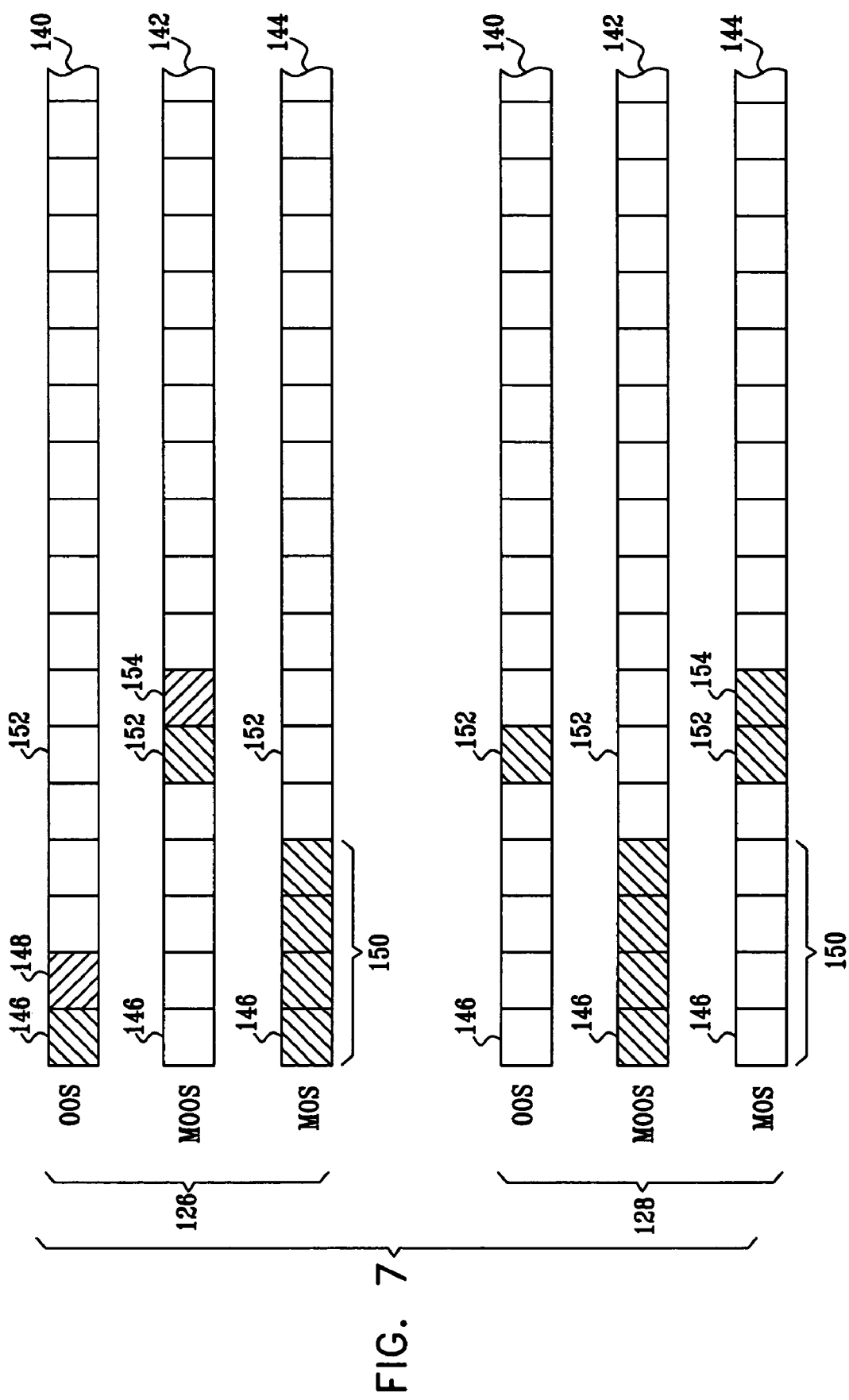
FIG. 7 is a schematic representation of data structures used in tracking data storage, in accordance with an embodiment of the present invention.

FIG. 7 is a schematic representation of data structures that are maintained on ARAs 126 and 128 for tracking data storage in system 120, in accordance with an embodiment of the present invention. These data structures are similar to the OOS, MOS and MOOS bitmaps described above, and their use in asynchronous mirroring is described in greater detail in the above-mentioned parent applications U.S. Ser. No. 10/673,733 and U.S. Ser. No. 10/673,745. The data structures are shown here as an aid to understanding how ARAs 126 and 128 serve host storage access requests, as described below with reference to FIG. 8.

Each of ARAs 126 and 128 maintains bitmaps 140, 142 and 144, typically in volatile memory. The bitmaps are used in recording the locations at which each of the ARAs has updated or is predicted to update the data on local storage media 124. Thus, these are also the locations at which the data on the local storage media are or may be out of sync with the data on remote storage media 36. ARA 126 and ARA 128 maintain identical views of the storage resources in system 120, i.e., each bit in the bitmaps maintained by ARA 126 refers to the same location on storage media 124 as does the corresponding bit in the bitmaps maintained by ARA 128. As a result, these bitmaps may be used not only for the purposes of data backup, but also for track locking, i.e., determining which ARA is entitled to access any given location in storage media 124 at any given time.

The specific purposes of the bitmaps shown in FIG. 7 are as follows:

Bitmap 140 is the OOS bitmap. It indicates, on each ARA, the locations on local storage media 124 to which that ARA has written host data, so that the locations are out of sync with the corresponding locations on remote storage media 36. In other words, these are locations to which the ARA has written updated data from host 130 or 132, but has not yet copied the data to remote storage media 36. Thus, when ARA 126, for example, signals host 130 to acknowledge a write operation to a specified track, without having sent the data over link 34 to the remote storage media, the control unit of ARA 126 sets the bit corresponding to this track in bitmap 140. The control unit then copies the data from this track to remote storage media 36, and clears the bit when it receives an acknowledgment from the remote site that the data have been stored there. Bitmap 140 on ARA 128 likewise indicates tracks on local storage media 124 to which ARA 128 has written host data that have not yet been copied to the remote storage media.

Bitmap 142 is the MOOS bitmap. As described above, bitmap 142 on ARA 128 contains a superset of the bits set in bitmap 140 on ARA 126, and vice versa. The MOOS bitmap, as in the preceding embodiments, indicates both first locations on local storage media 124 that are known to be out of sync with remote storage media 36, and second locations that are not currently out of sync, but to which host 32 is predicted to write in the near future. ARA 128 uses MOOS bitmap 142 in backing up data from local storage media 124 to remote storage media 36 in the even of a failure of ARA 126, as described in reference to the embodiment of FIG. 4. At the same time, the MOOS bitmap is used as a storage lock control: Because ARA 126 has written to or is predicted to write to the locations marked in MOOS bitmap 142 of ARA 128, these locations are effectively locked by ARA 126, and ARA 128 may not read from them or write to them until the corresponding bits are cleared. Since the ARAs are symmetrical, MOOS bitmap 142 on ARA 126 serves these same failure recovery and lock control functions vis-à-vis ARA 128.

Bitmap 144 is the MOS bitmap. Bitmap 144 on ARA 126 is a copy of bitmap 142 on ARA 128, and vice versa. In other words, when the control unit of ARA 126 instructs ARA 128 to set certain bits in bitmap 142 on ARA 128, the control unit also sets the corresponding bits in bitmap 144 on ARA 126. Thus, all bits that are set in bitmap 144 on ARA 128 are also set by the control unit of ARA 126 in its MOOS bitmap 142. A given bit may be set in either of bitmaps 142 and 144 on ARA 126 (and similarly on ARA 128), but not in both bitmaps.

Figure 8:
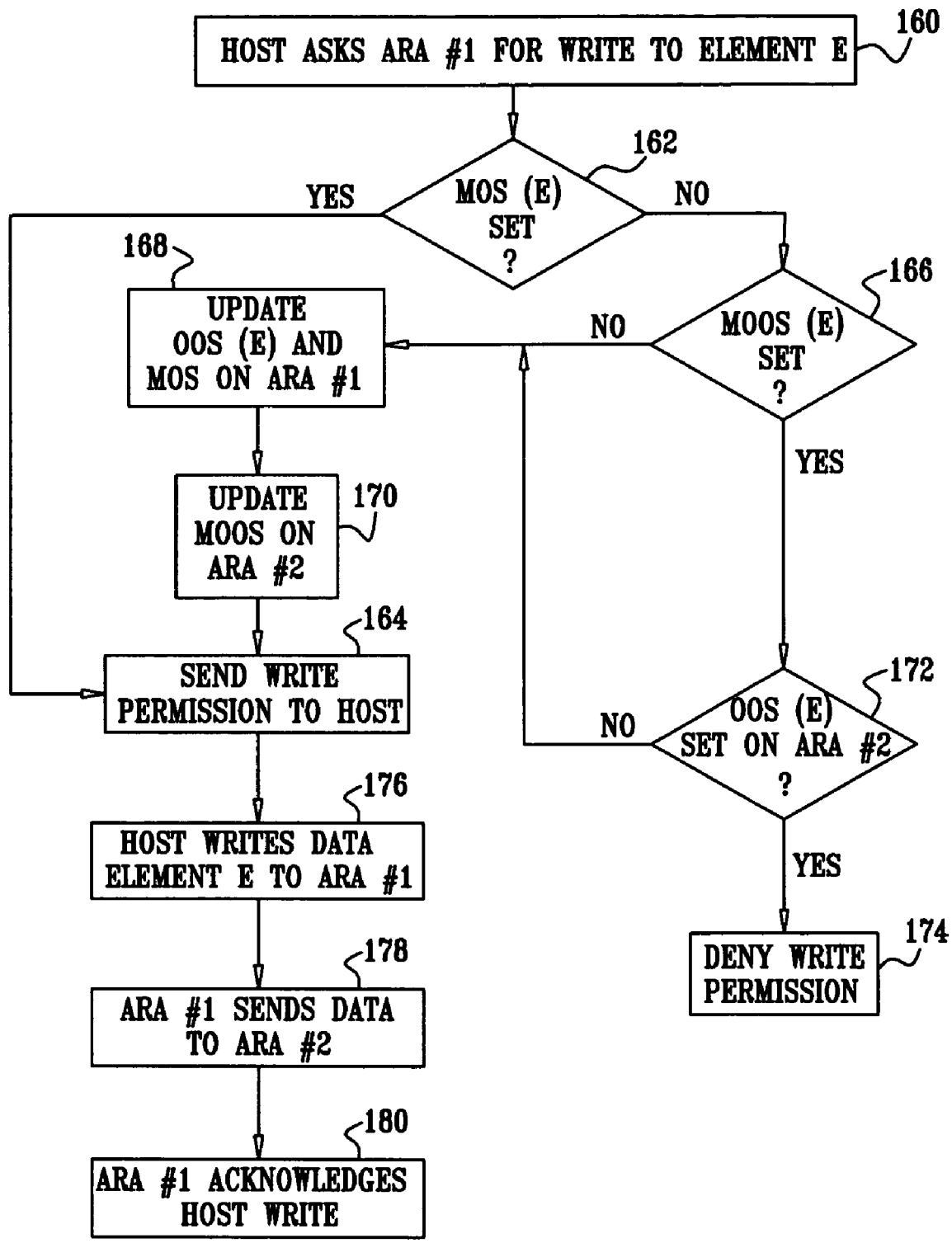
FIG. 8 is a flow chart that schematically illustrates a method for serving a host write request, in accordance with an embodiment of the present invention.

By way of example, as shown by the hatching in FIG. 7, certain bits 146, 148, 150, 152 and 154 are set in bitmaps 140, 142 and 144. These bits are referred to below in the description of a method for serving host write requests that is illustrated in FIG. 8. Further aspects of these bitmaps are described in the parent application U.S. Ser. No. 10/673,745, which also describes methods for serving host read and write commands that can be used, mutatis mutandis, in system 120.

Alternatively, when the storage control functions of ARA 126 and ARA 128 are not integrated with data backup, the meanings of bitmaps 140, 142 and 144 are slightly different, although the bitmaps are manipulated by the ARAs in a similar way to that described herein. In this case, each ARA sets the bits in OOS bitmap 140 to mark the locations that it has allocated for access by a given host, as long as the host has not finished with the access. These locations are locked against use by the other ARA. MOOS bitmap 142 and MOS bitmap 144 indicate the locations that are predicted to be allocated and thus may be locked.

FIG. 8 is a flow chart that schematically illustrates a method for serving a host write command in system 120, in accordance with an embodiment of the present invention. This method is initiated, for example, when host 130 requests permission to write data to track E on subsystem 24, at a write request step 160. In this example, the request is addressed to ARA 126. The control unit of ARA 126 checks its MOS bitmap 144, to determine whether MOS(E) is set, at a MOS checking step 162. If MOS(E) is set, it means that the corresponding bit MOOS(E) is already set, as well, on ARA 128. ARA 128 will not serve a read or write request (from host 132, for example) for track E, until ARA 126 has told ARA 128 that MOOS(E) can be cleared. Therefore, when MOS(E) is set, the control unit of ARA 126 may safely signal to host 130 that the host is permitted to transfer data to track E, at a write permission step 164, without the need for any synchronous communication with ARA 128 at this point.

Upon granting write permission to host 130, the control unit of ARA 126 also sets OOS(E) in bitmap 140 at step 164. When ARA 126 is used in controlling data backup, setting this bit indicates that the data in track E are now out of sync with remote storage medium 36. The data in this track are subsequently copied to medium 36 in an asynchronous mirroring process, as described above. After the data have been copied to medium 36, the corresponding bits in bitmaps 140 and 144 on ARA 126, as well as in bitmap 142 on ARA 128, are cleared. Efficient methods for use in clearing the bits in these bitmaps are described in the parent applications, particularly in U.S. Ser. No. 10/673,733.

Returning now to step 162, if MOS(E) is clear, the control unit of ARA 126 next checks whether MOOS(E) is set in bitmap 142, at a MOOS checking step 166. If MOOS(E) is also clear, the control unit may conclude that track E has not been locked by ARA 128, and the host write operation may be allowed to proceed. Before permitting host 130 to begin writing, however, the control unit of ARA 126 updates bitmaps 140 and 144, at a bitmap update step 168. The control unit sets OOS(E), for example, bit 146 in OOS bitmap 140, and selects a number of bits, such as bits 150, to be set in MOS bitmap 144, as shown in FIG. 7. In the present example, the control unit selects bits MOS(E) through MOS(E+N), with N=3. (Preferably, the control unit actually sets these bits in the MOS bitmap only after receiving an acknowledgment from ARA 128, as described below at step 170.) Subsequently, if ARA 126 receives a request from host 130 to write data to the track corresponding to bit 148, the control unit will determine at step 162 that the MOS bit for this track is already set, and the write operation will proceed to step 164 without delay. Various methods for choosing the bits to set at step 168 are described in the parent applications.

The control unit of ARA 126 sends a message to ARA 128, indicating that a data write to track E is about to take place, at a MOOS update step 170. Upon receiving this message, the control unit of ARA 128 updates its own MOOS bitmap 142, setting the same bits in bitmap 142 as were set in MOS bitmap 144 of ARA 126 at step 168. In this case, as shown in FIG. 7, bits 150 are set in MOOS bitmap 142 on ARA 128, which then returns an acknowledgment to ARA 126, indicating that the MOOS bitmap has been updated. Upon receiving the acknowledgment, the control unit of ARA 126 signals host 130 that the write operation can proceed, at step 164.

Returning now to step 166, if the control unit of ARA 126 finds that MOOS(E) is set for the track requested for writing by host 130 at step 160, it means that ARA 128 may be holding a lock on this track. For example, host 132 may have asked to write data to track E via ARA 128. It is even possible that another process running on host 130 has asked to access track E via ARA 128. When MOOS(E) is found to be set at step 166, the control unit of ARA 126 sends a message to ARA 128, to inquire whether OOS(E) is set in bitmap 140 of ARA 128, at a lock checking step 172. If OOS(E) is set on ARA 128, as is the case with bit 152, for example, it means that this track is effectively locked by ARA 128. In this event, the control unit of ARA 126 responds to host 130 with an indication that permission to write data to this location is denied, at a permission denial step 174. Optionally, the response sent by ARA 126 to host 130 at step 174 may redirect the host to submit its write request to ARA 128, which may be able to serve the request (if host 132 has completed its write operation, for example).

On the other hand, if the control unit of ARA 128 responds at step 172 that OOS(E) is not currently set in bitmap 140 on ARA 128, then ARA 126 may permit host 130 to write to track E. For example, bit 154 is set in MOOS bitmap 142 on ARA 126, but not in OOS bitmap 140 on ARA 128, and the corresponding track on storage media 124 is thus available for writing via ARA 126. This situation may arise, for instance, if ARA 128 has finished backing up the data written to track E, or if the predicted host write to track E via, ARA 128 did not actually come to pass. In this case, at step 168, the control unit of ARA 126 sets OOS(E) in its own bitmap 140, along with the appropriate bits in its MOS bitmap 144, at step 168, and it instructs ARA 128 to set the same bits in its MOOS bitmap 142, at step 170, as described above. The control unit of ARA 126 then signals host 130 to proceed with writing the data to track E at step 164.

After receiving the write permission at step 164, host 130 transfers the data to ARA 126, at a data writing step 176. The transfer may take place as a single data streaming operation, or it may be divided into a sequence of successive transfers of smaller quantities of data, depending on the storage protocol implemented in system 120. Optionally, for backup purposes, ARA 126 copies the data that it receives to ARA 128. Upon completion of each transfer of data from host 130, ARA 126 returns a write acknowledgment to the host, at a write acknowledge step 180. Depending on the configuration of system 120 and the memory resources available to ARAs 126 and 128, ARA 126 may acknowledge the host write either when the data have been written to non-volatile storage on media 124, or when the data have been copied to cache memory on both of ARAs 126 and 128, so that a single-point failure of ARA 126 will not cause data loss.

As noted earlier, although the method shown in FIG. 8 above refers to write operations carried out by ARA 126, similar write (and read) operations may be carried out at any time by ARA 128. These operations will be handled by ARA 128 using the methods described above, with the roles of ARA #1 and ARA #2 interchanged. Alternatively, one of the ARAs may be configured as a read-only node, so that all write operations are directed to the other ARA.

Although some of the methods and systems described above are adapted for asynchronous data backup, the principles of the present invention may also be applied, mutatis mutandis, in data storage systems that use synchronous mirroring techniques. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for managing a data storage system that includes first and second storage media, the method comprising:
maintaining a record predictive of locations to which data are to be written on the first storage medium by a host computer;
receiving a write command from the host computer directed to storing specified data at a specified location on the first storage medium;
if the specified location is not included in the record, updating the record responsively to the specified location;
signaling the host computer that the specified data have been stored in the data storage system responsively to storing the specified data and, if the specified location was not included in the record, responsively to updating the record;
copying the specified data to the second storage medium responsively to the record; and
storing the specified data in the specified location on both the first and second storage media.

2. The method according to claim 1, wherein copying the specified data comprises transmitting the specified data between mutually-remote sites over a communication link between the sites.

3. The method according to claim 1, wherein copying the specified data comprises asynchronously mirroring on the second storage medium the data that are stored on the first storage medium.

4. The method according to claim 1, wherein maintaining and updating the record comprise marking respective bits in a bitmap corresponding to the locations to which the data are to be written on the first and second storage media.

5. The method according to claim 1, wherein updating the record comprises predicting one or more further locations to which the host computer is expected to write the data in a subsequent write operation, and adding the one or more further locations to the record.

6. The method according to claim 1, wherein updating the record comprises removing one or more locations, other than the specified location, from the record, so as to limit a size of the record.

7. The method according to claim 1, wherein maintaining the record comprises storing the record in a nonvolatile memory, and wherein updating the record comprises modifying the record that is stored in the non-volatile memory.

8. The method according to claim 7, wherein modifying the record comprises:
comparing the specified location to a copy of the record held in a volatile memory;
modifying the copy of the record so that at least the specified location is included in the copy of the record; and
destaging the modified copy of the record to the non-volatile memory.

9. The method according to claim 8, wherein the record is not modified in the non-volatile memory responsively to receiving the write command as long as the specified location to which the specified data are to be written is included in the record.

10. The method according to claim 7, wherein modifying the record comprises adding a plurality of locations, including the specified location, to the record.

11. The method according to claim 7, wherein receiving the write command comprises intercepting the write command using a data storage appliance, which comprises the non-volatile memory, wherein the data storage appliance copies the specified data to the second storage medium, and maintains and updates the record in the non-volatile memory.

12. The method according to claim 11, wherein copying the specified data comprises, upon recovery from a failure of the data storage appliance, reading the record from the non-volatile memory, and copying the data to the second storage medium from the locations on the first storage medium that are indicated in the record.

13. The method according to claim 1, wherein receiving the write command comprises intercepting the write command using a data storage appliance, which maintains and updates the record, and which copies the specified data to the second storage medium.

14. The method according to claim 13, wherein copying the specified data comprises copying the data, using the data storage appliance, from the specified location on the first storage medium to the second storage medium.

15. The method according to claim 14, wherein copying the data comprises selecting the locations on the first storage medium, including the specified location, from which to copy the data responsively to the record.

16. The method according to claim 13, wherein intercepting the write command comprises receiving the write command at a first data storage appliance, and wherein maintaining the record comprises holding the record on a second data storage appliance, and wherein updating the record comprises sending a message from the first data storage appliance to the second data storage appliance so as to cause the second data storage appliance to update the record.

17. The method according to claim 16, wherein updating the record further comprises receiving an acknowledgment of the message at the first data storage appliance from the second data storage appliance, and wherein signaling the host computer comprises notifying the host computer that the specified data have been stored responsively to receiving the acknowledgment.

18. The method according to claim 16, and comprising, upon occurrence of a failure in the first data storage appliance, copying the data to the second storage medium using the second data storage appliance from the locations on the first storage medium that are indicated in the record.

19. The method according to claim 16, wherein maintaining the record comprises maintaining on the first data storage appliance a copy of the record held on the second data storage appliance, and wherein sending the message comprises deciding at the first data storage appliance to send the message responsively to the copy of the record.

20. The method according to claim 19, wherein sending the message comprises modifying both the record and the copy of the record responsively to the specified location.

21. The method according to claim 20, wherein modifying both the record and the copy of the record comprises adding a plurality of locations, including the specified location, to both the record and the copy of the record.

22. The method according to claim 21, wherein maintaining the copy of the record comprises selecting one or more locations, other than the specified location, to be removed from the record, and instructing the second data storage appliance to remove the one or more locations from the record, so as to limit a size of the record.

23. A method for managing a data storage system that includes a local storage medium, the method comprising:
coupling first and second data storage appliances to provide one or more host computers with access to the local storage medium via the data storage appliances;
maintaining on the second data storage appliance a record indicative of first locations on the local storage medium to which a host computer has directed a write command via the first data storage appliance;
adding to the record one or more entries that are predictive of second locations on the local storage medium to which data are expected to be written via the first data storage appliance;
receiving at the second data storage appliance, from one of the host computers, a request to access the data stored at a specified location on the local storage medium; and
if the specified location is included in the record, sending a message from the second data storage appliance to the first data storage appliance so as to ascertain a status of the data at the specified location before permitting the one of the host computers to access the data stored at the specified location.

24. The method according to claim 23, wherein coupling the first and second data storage appliances comprises configuring the data storage appliances to virtualize the access by the host computers to the local storage medium.

25. The method according to claim 23, and comprising copying the data stored on the local storage medium to a remote storage medium, using at least the first data storage appliance, in a data mirroring process.

26. The method according to claim 25, wherein copying the data comprises using both the first and second data storage appliances in the data mirroring process, wherein upon occurrence of a failure in the first data storage appliance, the second data storage appliance continues copying the data from the first and second locations responsively to the record.

27. The method according to claim 25, wherein the data mirroring process comprises an asynchronous data mirroring processing, and wherein maintaining the record comprises removing the locations from the record after the data stored at the locations have been copied to the a remote storage medium.

28. The method according to claim 23, and comprising permitting the one of the host computers to access the data stored at the specified location via the second data storage appliance in response to the request without sending the message if the specified location is not included in the record.

29. The method according to claim 23, wherein adding the one or more entries comprises, upon receiving the write command at the first data storage appliance to write the data to a given location, sending an instruction from the first data storage appliance to the second data storage appliance, which causes the second data storage appliance to include the given location and one or more of the second locations in the record.

30. The method according to claim 29, wherein maintaining the record comprises maintaining a copy of the record on the first data storage appliance, and wherein sending the instruction comprises determining whether to send the instruction responsively to the copy of the record.

31. The method according to claim 30, wherein determining whether to send the instruction comprises deciding to send the instruction only if the given location is not included in the record.

32. The method according to claim 23, wherein receiving the request from the one of the host computers comprises receiving a further write command from the one of the host computers at the second data storage appliance, and updating the data stored at the specified location, using the second data storage appliance, responsively to the further write command.

33. The method according to claim 32, and comprising:
maintaining a further record on the first data storage appliance, indicative of third locations at the which the data have been updated by the second data storage appliance and including further entries that are predictive of fourth locations on the local storage medium to which data are expected to be written via the second data storage appliance;
receiving at the first data storage appliance, from a further one of the host computers, a further request to access the data stored at a further location on the local storage medium; and
if the further location is included in the record, sending a further message from the first data storage appliance to the second data storage appliance so as to ascertain the status of the data at the further location before permitting the further one of the host computers to access the data stored at the further location.

34. The method according to claim 23, and comprising, upon occurrence of a failure in the second data storage appliance, configuring the first data storage appliance to provide the data directly to the one of the host computers.

35. The method according to claim 23, wherein maintaining the record comprises marking respective bits in a bitmap corresponding to the locations that are included in the record.

36. Apparatus for data storage, comprising:
first and second storage media; and
at least one data storage appliance, comprising a memory and a control unit, which is coupled to intercept write commands issued by a host computer for writing data to the first storage medium, and to copy the data to the second storage medium in a mirroring process so that the data are stored on both the first and second storage media, and
wherein the control unit is arranged to maintain in the memory a record predictive of locations to which the data are to be written on the first storage medium by a host computer, and to copy the data to the second storage medium responsively to the record, and
wherein the control unit is further arranged, upon receiving a write command from the host computer directed to storing specified data at a specified location on the first storage medium, to update the record responsively to the specified location if the specified location is not included in the record, and to signal the host computer that the specified data have been stored in the data storage system responsively to storing the specified data and, if the specified location was not included in the record, responsively to updating the record.

37. The apparatus according to claim 36, wherein the control unit is arranged to update the record by predicting one or more further locations to which the host computer is expected to write the data in a subsequent write operation, and adding the one or more further locations to the record.

38. The apparatus according to claim 36, wherein the control unit is further arranged to update the record by removing one or more locations, other than the specified location, from the record, so as to limit a size of the record.

39. The apparatus according to claim 36, wherein the memory of the at least one data storage appliance comprises a non-volatile memory, and wherein the control unit is arranged to store the record in the non-volatile memory, and to update the record by modifying the record that is stored in the non-volatile memory.

40. The apparatus according to claim 39, wherein the memory of the at least one data storage appliance further comprises a volatile memory, and wherein the control unit is arranged to hold a copy of the record in the volatile memory, and to modify the record by comparing the specified location to the copy of the record, modifying the copy of the record so that at least the specified location is included in the copy of the record, and destaging the modified copy of the record to the non-volatile memory.

41. The apparatus according to claim 40, wherein the record is not modified in the non-volatile memory responsively to receiving the write command as long as the specified location to which the specified data are to be written is included in the record.

42. The apparatus according to claim 39, wherein the control unit is arranged, upon modifying the record, to add a plurality of locations, including the specified location, to the record.

43. The apparatus according to claim 39, wherein the control unit is arranged, upon recovery from a failure of the at least one data storage appliance, to read the record from the nonvolatile memory, and to copy the data to the second storage medium from the locations on the first storage medium that are indicated in the record.

44. The apparatus according to claim 36, wherein the at least one data storage appliance comprises first and second data storage appliances, wherein the record is held on the second data storage appliance, and wherein the first data storage appliance is arranged, upon receiving the write command from the host computer, to send a message to the second data storage appliance so as to cause the second data storage appliance to update the record.

45. The apparatus according to claim 44, wherein the second data storage appliance is arranged to send an acknowledgment of the message to the first data storage appliance, and wherein the first data storage appliance is arranged to notify the host computer that the specified data have been stored responsively to receiving the acknowledgment.

46. The apparatus according to claim 44, wherein the second data storage appliance is arranged, upon occurrence of a failure in the first data storage appliance, to copy the data to the second storage medium from the locations on the first storage medium that are indicated in the record.

47. The apparatus according to claim 44, wherein the first data storage appliance is arranged to maintain a copy of the record held on the second data storage appliance, and to decide to send the message responsively to the copy of the record.

48. The apparatus according to claim 47, wherein both the record and the copy of the record are modified responsively to the message.

49. The apparatus according to claim 48, wherein the first and second data storage appliances are arranged to modify the record and the copy of the record by adding a plurality of locations, including the specified location, to both the record and the copy of the record.

50. The apparatus according to claim 44, wherein the first data storage appliance is arranged to select one or more locations, other than the specified location, to be removed from the record, and to instruct the second data storage appliance to remove the one or more locations from the record, so as to limit a size of the record.

51. Data storage apparatus, comprising:
a local storage medium; and
first and second data storage appliances, which are coupled to provide one or more host computers with access to the local storage medium via the data storage appliances,
wherein the second data storage appliance is arranged to maintain a record indicative of first locations on the local storage medium to which a host computer has directed a write command via the first data storage appliance, and to add to the record one or more entries that are predictive of second locations on the local storage medium to which data are expected to be written via the first data storage appliance, and
wherein the second data storage appliance is arranged, upon receiving a request from one of the host computers to access the data stored at a specified location on the local storage medium, if the specified location is included in the record, to send a message to the first data storage appliance so as to ascertain a status of the data at the specified location before permitting the one of the host computers to access the data stored at the specified location.

52. The apparatus according to claim 51, wherein the first and second data storage appliances are configured to virtualize the access by the host computers to the local storage medium.

53. The apparatus according to claim 51, wherein at least the first data storage appliance is arranged to copy the data stored on the local storage medium to a remote storage medium in a data mirroring process.

54. The apparatus according to claim 53, wherein the second data storage appliance is arranged, upon occurrence of a failure in the first data storage appliance, to continue copying the data from the first and second locations to the remote storage medium responsively to the record.

55. The apparatus according to claim 53, wherein the data mirroring process comprises an asynchronous data mirroring processing, and wherein the data storage appliances are arranged to remove the locations from the record after the data stored at the locations have been copied to the a remote storage medium.

56. The apparatus according to claim 51, wherein the second data storage appliance is arranged to permit the one of the host computers to access the data stored at the specified location via the second data storage appliance in response to the request without sending the message it the specified location is not included in the record.

57. The apparatus according to claim 51, wherein the first data storage appliance is arranged, upon receiving the write command from the host computer to write the data to a given location, to send an instruction to the second data storage appliance, which causes the second data storage appliance to include the given location and one or more of the second locations in the record.

58. The apparatus according to claim 57, wherein the first data storage appliance is arranged to maintain a copy of the record, and to determine whether to send the instruction responsively to the copy of the record.

59. The apparatus according to claim 58, wherein the first data storage appliance is arranged to send the instruction only if the given location is not included in the record.

60. The apparatus according to claim 51, wherein the second data storage appliance is arranged to receive a further write command from the one of the host computers, and to update the data stored at the specified location responsively to the further write command and to the record.

61. The apparatus according to claim 60, wherein the first data storage appliance is arranged to maintain a further record, indicative of third locations at the which the data have been updated by the second data storage appliance and including further entries that are predictive of fourth locations on the local storage medium to which data are expected to be written via the second data storage appliance, and
wherein the first data storage appliance is arranged, upon receiving from a further one of the host computers a further request to access the data stored at a further location on the local storage medium, if the further location is included in the record, to send a further message to the second data storage appliance so as to ascertain the status of the data at the further location before permitting the further one of the host computers to access the data stored at the further location.

62. The apparatus according to claim 51, wherein the first data storage appliance is arranged, upon occurrence of a failure in the second data storage appliance, to provide the data directly to the one of the host computers.

63. The apparatus according to claim 51, wherein the record comprises a bitmap.

64. A computer software product for use in a data storage system that includes first and second storage media and at least one data storage appliance having a control unit, the product comprising a computer-readable medium in which program instructions are stored, which instructions, when read by the control unit, cause the data storage appliance to intercept write commands issued by a host computer for writing data to the first storage medium, and to copy the data to the second storage medium in a mirroring process so that the data are stored on both the first and second storage media,
wherein the instructions cause the control unit to maintain a record predictive of locations to which the data are to be written on the first storage medium by a host computer, and to copy the data to the second storage medium responsively to the record, and
wherein the instructions cause the control unit, upon receiving a write command from the host computer directed to storing specified data at a specified location on the first storage medium, to update the record responsively to the specified location if the specified location is not included in the record, and to signal the host computer that the specified data have been stored in the data storage system responsively to storing the specified data and, if the specified location was not included in the record, responsively to updating the record.

65. The product according to claim 64, wherein the instructions cause the control unit to update the record by predicting one or more further locations to which the host computer is expected to write the data in a subsequent write operation, and adding the one or more further locations to the record.

66. The product according to claim 64, wherein the instructions cause the control unit to update the record by removing one or more locations, other than the specified location, from the record, so as to limit a size of the record.

67. The product according to claim 64, wherein the at least one data storage appliance comprises a non-volatile memory, and wherein the instructions cause the control unit to store the record in the non-volatile memory, and to update the record by modifying the record that is stored in the non-volatile memory.

68. The product according to claim 67, wherein the at least one data storage appliance further comprises a volatile memory, and wherein the instructions cause the control unit to hold a copy of the record in the volatile memory, and to modify the record by comparing the specified location to the copy of the record, modifying the copy of the record so that at least the specified location is included in the copy of the record, and destaging the modified copy of the record to the non-volatile memory.

69. The product according to claim 68, wherein the record is not modified in the non-volatile memory responsively to receiving the write command as long as the specified location to which the specified data are to be written is included in the record.

70. The product according to claim 67, wherein the instructions cause the control unit, upon modifying the record, to add a plurality of locations, including the specified location, to the record.

71. The product according to claim 67, wherein the instructions cause the control unit, upon recovery from a failure of the at least one data storage appliance, to read the record from the non-volatile memory, and to copy the data to the second storage medium from the locations on the first storage medium that are indicated in the record.

72. The product according to claim 64, wherein the at least one data storage appliance comprises first and second data storage appliances, which comprise respective first and second control units, wherein the record is held on the second data storage appliance, and wherein the instructions cause the first control unit, upon receiving the write command from the host computer, to send a message to the second data storage appliance so as to cause the second data storage appliance to update the record.

73. The product according to claim 72, wherein the instructions cause the second control unit to send an acknowledgment of the message to the first data storage appliance, arid cause the first control unit to notify the host computer that the specified data have been stored responsively to receiving the acknowledgment.

74. The product according to claim 72, wherein the instructions cause the second control unit, upon occurrence of a failure in the first data storage appliance, to copy the data to the second storage medium from the locations on the first storage medium that are indicated in the record.

75. The product according to claim 72, wherein the instructions cause the first control unit to maintain a copy of the record held on the second data storage appliance, and to decide to send the message responsively to the copy of the record.

76. The product according to claim 75, wherein both the record and the copy of the record are modified responsively to the message.

77. The product according to claim 76, wherein the instructions cause the first and second control units to modify the record and the copy of the record by adding a plurality of locations, including the specified location, to both the record and the copy of the record.

78. The product according to claim 72, wherein the instructions cause the first control unit to select one or more locations, other than the specified location, to be removed from the record, and to instruct the second data storage appliance to remove the one or more locations from the record, so as to limit a size of the record.

79. A computer software product for use in a data storage system that includes a local storage media and first and second data storage appliances, which include respective first and second control units and are coupled to provide one or more host computers with access to the local storage medium via the data storage appliances, the product comprising a computer-readable medium in which program instructions are stored, which instructions, when read by the control units, cause the second control unit to maintain a record indicative of first locations on the local storage medium to which a host computer has directed a write command via the first data storage appliance, and to add to the record one or more entries that are predictive of second locations on the local storage medium to which data are expected to be written via the first data storage appliance, and wherein the instructions further cause the second control unit, upon receiving a request from one of the host computers to access the data stored at a specified location on the local storage medium, if the specified location is included in the record, to send a message to the first data storage appliance so as to ascertain a status of the data at the specified location before permitting the one of the host computers to access the data stored at the specified location.

80. The product according to claim 79, wherein the instructions cause the first and second control unit to virtualize the access by the host computers to the local storage medium.

81. The product according to claim 79, wherein the instructions cause at least the first control unit to copy the data stored on the local storage medium to a remote storage medium in a data mirroring process.

82. The product according to claim 81, wherein the instructions cause the second control unit, upon occurrence of a failure in the first data storage appliance, to continue copying the data from the first and second locations to the remote storage medium responsively to the record.

83. The product according to claim 81, wherein the data mirroring process comprises an asynchronous data mirroring processing, and wherein the instructions cause the second control unit to remove the locations from the record after the data stored at the locations have been copied to the a remote storage medium.

84. The product according to claim 79, wherein the instructions cause the second control unit to permit the one of the host computers to access the data stored at the specified location via the second data storage appliance in response to the request without sending the message if the specified location is not included in the record.

85. The product according to claim 79, wherein the instructions cause the first control unit, upon receiving the write command from the host computer to write the data to a given location, to send an instruction to the second data storage appliance, which causes the second data storage appliance to include the given location and one or more of the second locations in the record.

86. The product according to claim 85, wherein the instructions cause the first control unit to maintain a copy of the record, and to determine whether to send the instruction responsively to the copy of the record.

87. The product according to claim 86, wherein the instructions cause the first control unit to send the instruction only if the given location is not included in the record.

88. The product according to claim 79, wherein the instructions cause the second control unit, upon receiving a further write command from the one of the host computers, to update the data stored at the specified location responsively to the further write command and to the record.

89. The product according to claim 88, wherein the instructions cause the first control unit to maintain a further record, indicative of third locations at the which the data have been updated by the second data storage appliance and including further entries that are predictive of fourth locations on the local storage medium to which data are expected to be written via the second data storage appliance, and wherein the instructions further cause the first control unit, upon receiving from a further one of the host computers a further request to access the data stored at a further location on the local storage medium, if the further location is included in the record, to send a further message to the second data storage appliance so as to ascertain the status of the data at the further location before permitting the further one of the host computers to access the data stored at the further location.

90. The product according to claim 79, wherein the instructions cause the first control unit, upon occurrence of a failure in the second data storage appliance, to provide the data directly to the one of the host computers.

91. The product according to claim 79, wherein the record comprises a bitmap.

* * * * *